April 21, 1925.  
W. H. KINNEY  
1,534,268  
SPRING STRUCTURE AND METHOD OF ASSEMBLING SAME  
Filed April 19, 1920
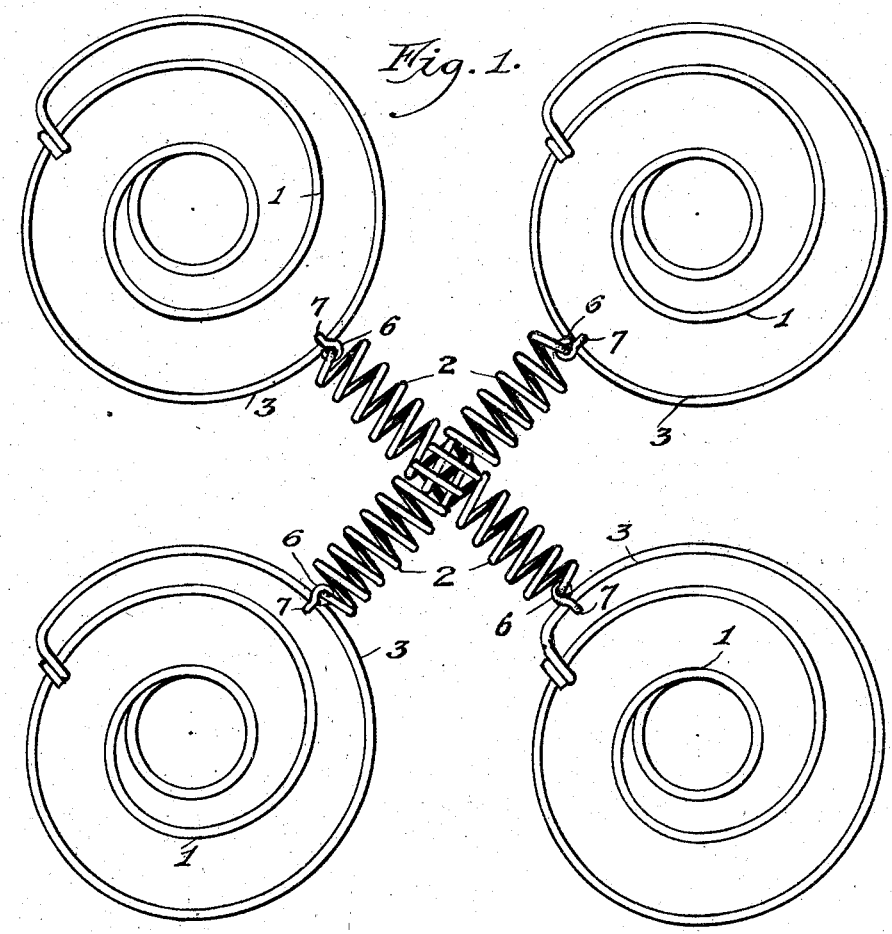
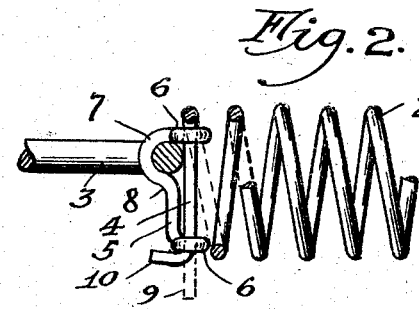
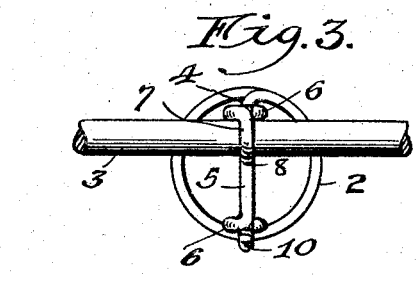
Witness,  
S. F. Mann
Inventor,  
William H. Kinney.  
By Fisher, Towle, Clapp & Soans  
Attys.

Patented Apr. 21, 1925.

1,534,268

UNITED STATES PATENT OFFICE.

WILLIAM H. KINNEY, OF CHICAGO, ILLINOIS, ASSIGNOR TO KINNEY-ROME COMPANY, OF CHICAGO, ILLINOIS, A CORPORATION.

SPRING STRUCTURE AND METHOD OF ASSEMBLING SAME.

Application filed April 19, 1920. Serial No. 375,018.

*To all whom it may concern:*

Be it known that I, WILLIAM H. KINNEY, a citizen of the United States, residing at Chicago, in the county of Cook and State of Illinois, have invented certain new and useful Improvements in Spring Structures and Methods of Assembling Same, of which the following is a specification.

My invention relates to upholstering spring structures such as bed and cushion springs, as for example, in structures wherein vertically disposed uphlostering springs or main cushioning springs are connected with one another by horizontally disposed spiral spacing springs. The invention seeks to provide improved means for coupling the upholstering and spacing springs, which will securely connect same and to provide an improved method of assembling which will facilitate and cheapen the manufacture of same.

The invention consists in the features of improvement herein set forth illustrated in its preferred embodiment in the accompanying drawings and pointed out in the appended claims.

In the drawing, Fig. 1 is a partial plan view of a spring structure embodying my invention; Fig. 2, a detail side view of the connection on an enlarged scale with parts thereof shown in section, and Fig. 3 is an end view of the parts shown in Fig. 2.

In the spring structures of the type to which my improvement more particularly relates, it is customary to hold the main cushioning springs at proper distances apart by means of small spiral or coil springs which have their ends connected with the main springs at the proper point to maintain the desired distance between the latter. It has been customary to make the connection of the main spring with the end of the spacing spring by means of a connector loop which embraces a coil of the main spring and has arms inserted in the end of the spacer spring and formed with outturned hooks at the inner ends of the arms to engage a coil of the spacer spring at a distance from the end so as to secure the connector to the spacer spring and maintain the end coils at a tension which was exerted against the coil of the main spring. On account of the necessity of having somewhat long outturned ends to afford a dependable hook connection of the connector loop with the spacer spring, the connector could not be inserted directly into the end of the spacer spring and it was necessary to screw the end of the spacer spring over the inner end of the connector loop after the latter was placed upon the coil of the main spring. This involved much loss of time and also necessitated the spacer spring being screwed onto the connector at one end much farther than required in the normal position so that the opposite end could be thereafter screwed in the reverse direction onto a connector of another spring, during which operation the first mentioned end of the spacer spring was unscrewed a corresponding amount from the first connector. Obviously such a method of assembling the parts was expensive, and the primary object of my present invention is to effect a material saving of labor and reduce the cost of the assembling operation and at the same time afford a secure connector which will not readily become loose or unfastened.

Referring to the drawings, the reference numeral 1 indicates upholstering springs which may be of any usual construction, such as the hourglass or similar type and 2, the spacing springs which extend between and connect with the uppermost coils 3 of the springs 1. In the drawing, I have shown only four of the upholstering springs 1, but it will be understood, of course, that these springs will be employed in suitable number for a bed or other cushion in which the spring structure is to be used. Ordinarily the spacing springs 2 will be arranged so as to intersect each other as indicated in Fig. 1 of the drawing, but this is a well known arrangement and forms no part of the present invention.

For connecting the ends of the springs 2 with the upper coils of the upholstering springs 1, I form each spring 2 at each end with a downwardly extending diametrically arranged portion or arm 4, preferably although not necessarily, of slightly greater length than the diameter of the coils of the spring 2. A loop 5 having eyes 6 horizontally disposed as shown and spaced apart a somewhat less distance than the diameter of the coils of the spring 2 has an offset portion 7 at the upper end affording a seat to engage around the coil 3 of the upholstering spring, with an indentation 8 which holds the coil 3 within such seat at the upper end of the connector loop. After the connector 5 has been placed in proper position on the coil 3, the end 4 of the spring 2 is inserted down through both of the eyes 6 6 as shown in Fig. 2, the end 4 when so engaged serving to lock the coil 3 in the seat portion 7 of the connector and the lower extremity of the arm 4, which is indicated by dotted lines at 9 on Fig. 2 is then bent laterally under the lower eye 6 as shown at 10 in Fig. 2 or in any other suitable manner so as to lock the connector 5 on the arm 4 of the spring 2.

Obviously the arm 4 and connector 5 may be shorter than the size I have shown herein without materially affecting the practicability of the device and in fact the connector may if desired consist of a short loop with the eyes 6 spaced apart a distance substantially equal to the diameter of the coil 3 and the arm 4 may be correspondingly shortened to provide merely sufficient length thereof so as to extend through the eyes 6 of the projecting connector and afford a portion which may be bent under the lower eye so as to lock the connector in place thereon.

With the construction hereinbefore described, it is unnecessary to rotate the springs 2 in order to connect same with the spring 1 as with connectors heretofore employed but the springs 2 are connected together in pairs as shown in Fig. 2 with the end arms 4 thereof extended downwardly and then loops or connectors 5 are placed on the coils 3 of the springs 1 and the end arms 4 of the springs 2 inserted through the eyes 6 of the connectors after which the ends 9 thereof are bent as hereinbefore indicated so as to lock the connector on the end of spring 2 and thus effect a secure connection of the springs 2 with the springs 1.

It will be observed that with this connector a high degree of flexibility is afforded so that no undue strain is imposed upon the connection, inasmuch as the seat portion 7 pivots horizontally on the coil 3 and the arm 4 pivots vertically in the eyes 6 of the connector. The object of forming the connectors 5 with the offset seats 7 at their upper ends is to insure holding the upper portions of the spacing springs more nearly in line with the upper coils of the upholstering springs, thus giving a flatter and more uniform surface to the structure.

While I have described what I regard as the preferred embodiment of the invention, it is obvious that details may be varied without departing from the scope thereof which is to be determined by the appended claims.

I claim as my invention:

1. In a spring structure, the combination of an upholstering spring, a spacing spring extending laterally from the upholstering spring, and a connector which holds a coil of the upholstering spring against the end of the spacing spring, said connector being formed with vertically spaced arms having apertures through which the end of the spacing spring is inserted.

2. In a spring structure, the combination of an upholstering spring, a spacing spring extending laterally from the upholstering spring, and a connector whereby a coil of the upholstering spring is secured to the end of the spacing spring, said connector comprising a vertically elongated member having apertured ends through which the end portion of the spacing spring is inserted, and a seat spaced from the lower arm adjacent the upper arm and engaging the coil of the upholstering spring for maintaining same eccentrically above the axis of the spacing spring.

3. In a spring structure, the combination of an upholstering spring, a spacing spring having an upright portion at the end extending substantially at right angles to the axis of the spacing spring, and a connector comprising a seat portion engaging a coil of the upholstering spring and interposed between vertically spaced arms, said arms being provided with apertures engaged by the aforesaid upright portion of the spacing spring so as to be held against swinging movement in a vertical plane relatively to the end of the spacing spring, and means for locking the connector on the end of the spacing spring.

Chicago, Ill., April 5, 1920.

WILLIAM H. KINNEY.